United States Patent [19]

Hofmann

[11] Patent Number: 5,883,677
[45] Date of Patent: Mar. 16, 1999

[54] METHOD AND APPARATUS FOR MANAGING MULTIPLE OUTSIDE VIDEO SERVICE PROVIDERS

[75] Inventor: Judson A. Hofmann, Mendham, N.J.

[73] Assignee: Panasonic Technologies Inc., Princeton, N.J.

[21] Appl. No.: 918,432

[22] Filed: Aug. 26, 1997

Related U.S. Application Data

[63] Continuation of Ser. No. 402,943, Mar. 13, 1995, abandoned.

[51] Int. Cl.$^6$ ........................................................ H04N 7/10
[52] U.S. Cl. ............................ 548/384; 348/906; 348/12; 348/13; 348/6; 348/7; 455/5.1
[58] Field of Search ................................. 348/6, 7, 8, 12, 348/13, 906, 563, 569, 684; 455/5.1; H04N 7/10

[56] References Cited

U.S. PATENT DOCUMENTS

| | | | |
|---|---|---|---|
| 4,305,101 | 12/1981 | Yarbrough et al. | 360/69 |
| 4,329,684 | 5/1982 | Monteath et al. | 345/180 |
| 4,621,259 | 11/1986 | Schepers et al. | 345/180 |
| 4,706,121 | 11/1987 | Young | 348/27 |
| 4,751,578 | 6/1988 | Reiter et al. | 358/183 |
| 4,787,063 | 11/1988 | Muguet | 386/83 |
| 4,847,696 | 7/1989 | Matsumoto et al. | 386/83 |
| 4,879,611 | 11/1989 | Fukui et al. | 360/69 |
| 4,908,713 | 3/1990 | Levine | 386/83 |
| 4,963,994 | 10/1990 | Levine | 386/83 |
| 4,977,455 | 12/1990 | Young | 358/142 |
| 5,099,319 | 3/1992 | Esch et al. | 348/9 |
| 5,151,789 | 9/1992 | Young | 358/194.1 |
| 5,166,911 | 11/1992 | Misawa et al. | 368/10 |
| 5,179,439 | 1/1993 | Hashimoto | 348/731 |
| 5,195,134 | 3/1993 | Inoue | 380/20 |
| 5,212,553 | 5/1993 | Maruoka | 358/188 |
| 5,412,416 | 5/1995 | Nemirofsky | 348/10 |
| 5,416,508 | 5/1995 | Sakuma et al. | 348/3 |
| 5,483,278 | 1/1996 | Straubbe et al. | 348/7 |
| 5,517,254 | 5/1996 | Monta et al. | 348/569 |
| 5,532,754 | 7/1996 | Young et al. | 348/569 |
| 5,550,576 | 8/1996 | Klosterman | 348/6 |
| 5,559,548 | 9/1996 | Davis et al. | 348/6 |
| 5,684,525 | 11/1997 | Klosterman | 348/584 |
| 5,694,176 | 12/1997 | Bruette et al. | 348/906 |
| 5,699,125 | 12/1997 | Rzeszewski et al. | 348/908 |

FOREIGN PATENT DOCUMENTS 582023  2/1994  European Pat. Off. .

OTHER PUBLICATIONS

StarSight Telecast, Inc. multi–folded advertising brochure, "In the beginning, television viewers had two choices, On or Off.", (1994).

StarSight Telecast, Inc. advertising literature (13pp.), (1993).

*Primary Examiner*—John K. Peng
*Assistant Examiner*—Linus H. Lo
*Attorney, Agent, or Firm*—Ratner & Prestia

[57] ABSTRACT

A method and apparatus for receiving, organizing and presenting program information to a display device in a home from at least two outside sources such as CATV, telephone companies (TELCOs) and direct broadcast satellite (DBS) is disclosed. A distribution network is established within the home using, for example, a consumer electronics bus (CEBus). First, a plurality of signals each from a different outside source and each being associated with information for constructing a program information database for the respective source are received. Next, the separate streams of program information for each outside source are integrated into a single merged database, entries of which can be accessed as a function of user supplied criteria. Additionally, information may be appended to each record of the entries in the separate streams of program information which indicate source and/or cost, and, finally, the information contained in the merged database is presented via the CEBus to a user for viewing and function selection.

22 Claims, 9 Drawing Sheets

```
SELECTIONS: COMEDIES          DATE: 06/06/94

CATV
1. ANIMAL HOUSE              7PM        HBO        N/A
2. CADDYSHACK                10PM       PRISM      N/A
         ⋮

TELCOS
1. HISTORY OF THE WORLD      8:30PM                $2
         ⋮

DBS
1. NAKED GUN PART 33⅓        9PM                   $5
2. MY COUSIN VINNY           11PM                  $5
```

FIG. 9A

```
SELECTIONS: COMEDIES                   DATE: 06/06/94

TITLE                    TIME      SOURCE       COST
1. ANIMAL HOUSE               7PM       CATV:HBO     N/A

2. CADDYSHACK                 10PM      CATV:PRISM   N/A

3. HISTORY OF THE WORLD       8:30PM    TELCO        $2
        PART 1

4. MY COUSIN VINNY            9PM       DBS          $5

5. NAKED GUN PART 33⅓         11PM      DBS          $5
```

FIG. 9B

METHOD AND APPARATUS FOR MANAGING MULTIPLE OUTSIDE VIDEO SERVICE PROVIDERS

This application is a continuation of application Ser. No. 08/402,943 filed Mar. 13, 1995, now abandoned.

FIELD OF THE INVENTION

The present invention generally relates to receiving transmissions from multiple sources of video services and, more particularly, it relates to receiving, organizing, and displaying information related to the services of the multiple sources.

BACKGROUND OF THE INVENTION

Currently, homes in North America either depend on cable systems to deliver entertainment programs, or they use an antenna or a satellite dish to receive broadcast television signals. The trend is such that the cable industry will ultimately be connected to about 85–90% of the homes in the United States.

Present practice in most cable systems is to place an interface on each television receiver that is connected to the system. The interface descrambles protected programs. The interface, in its present implementations, creates difficulties for the consumer who wants to use certain features. In particular, it may be difficult to time-shift and record scrambled programs because the VCR cannot control the descrambler.

The cable industry is presently in the process of investigating new technology to increase the number of programs that can be delivered to the home. This is being done via two technologically strategic moves. The first is to increase the bandwidth of the cable plant to 1 GHz (which provides for 150 6 MHz channels). The second is to use video compression to carry up to 10 programs in one 6 MHz wide channel. Typical numbers that are used in the industry are about 500 programs can be delivered to the home in such a fashion.

Obviously, it is a considerable problem for subscribers to search through 500 channels to find a program they wish to watch. Therefore, these new systems will have electronic menus that present the programming on the system in easy-to-read on-screen menus. This menuing system will have its own remote control to provide cursor control for easy selection of a program.

Some advanced systems, such as the Starsight product made by Insight Systems, now being brought to market increase the sophistication of the remote controller so that it becomes a video cassette recorder (VCR) programmer at a system level: when an Electronic Program Guide (EPG) signals that a desired program is starting, it turns on the VCR, sets it to record, turns on the descrambler and tunes it to the correct channel. If the program is being delivered in compressed fashion, the video decompressor is turned on and tuned to the correct program in the correct channel. In the case where there are multiple television receivers in the home connected to the cable system, each receiver is desirably equipped with an EPG remote control.

Other businesses are competing with the cable industry in delivering entertainment and other services to U.S. homes. The telephone companies ("TELCOS"), for example, have announced their intentions, as have at least two companies which have announced that they will deliver entertainment services via Direct Broadcast Satellite ("DBS"). Each of these delivery services would also broadcast its own EPG, possibly using different transmission protocols. In addition, there are companies competing with Starsight such as TV Guide On-line.

One patent known in this field is U.S. Pat. No. 4,751,578 issued to Reiter et al. This patent is directed to an electronic television programming information display system which enables the user to control the format and content of that display. The main components of the system, as shown in FIG. 2, include microcontroller 60, mixer 70, and program schedule information receiving means 67. In the presently developing environment of program service providers, however, the Reiter et al. system is limited because Reiter only receives a single source of program schedule information.

Some of the potential problems that may be encountered when these systems are used are: 1) each service will have to have its own terminal on each TV, 2) the subscriber will have to choose the correct remote control to operate a particular services' program guide, and 3) each service program guide may use a different user interface protocol (e.g., highlight and click, enter a number, etc.) for function selection.

SUMMARY OF THE INVENTION

The present invention involves a method and apparatus for receiving, organizing and presenting program information to a display device in a home from at least two outside sources. First, at least two signals each from a different source and originating from outside the home are received where each of the two signals contains a respective program information stream or where each of the two signals include information for a respective program menu for the respective source and each stream of program information contains a plurality of program entries. Next, the respective streams of program information are integrated, in a predetermined manner, in a single merged database. Finally, according to user provided criteria, the program entries contained in the merged database are displayed to a user for viewing and function selection.

According to another aspect of the present invention, additional information is appended to each record of the different program entries, indicative of source, for database location and search purposes.

According to still another aspect of the present invention, additional information is appended to each record of the different program entries indicative of a cost associated with the record also for search purposes.

BRIEF DESCRIPTION OF THE DRAWINGS

The invention is best understood from the following detailed description when read in connection with the accompanying drawing, in which.

DETAILED DESCRIPTION

The present invention provides for receiving, organizing, and presenting all of the wideband delivery services subscribed to by a user. The present invention, among other functions, receives program information (e.g, an electronic program guide—EPG signal) from each service and constructs a single merged (or integrated) database which contains the program information for each service provider.

In the exemplary embodiment of the present invention, on-screen menus are generated from the merged database rather than from the individual services. The displayed menus can be formatted in accordance with user criteria and/or requirements from the individual service providers. All of the EPG services normally available from the individual services' EPGs are available from the integrated output. Such services usually include a display of programs by type (e.g., movies, news, etc.), sub-type (e.g., movies: comedies, dramas, mysteries, etc.) and so on.

Figure 1:
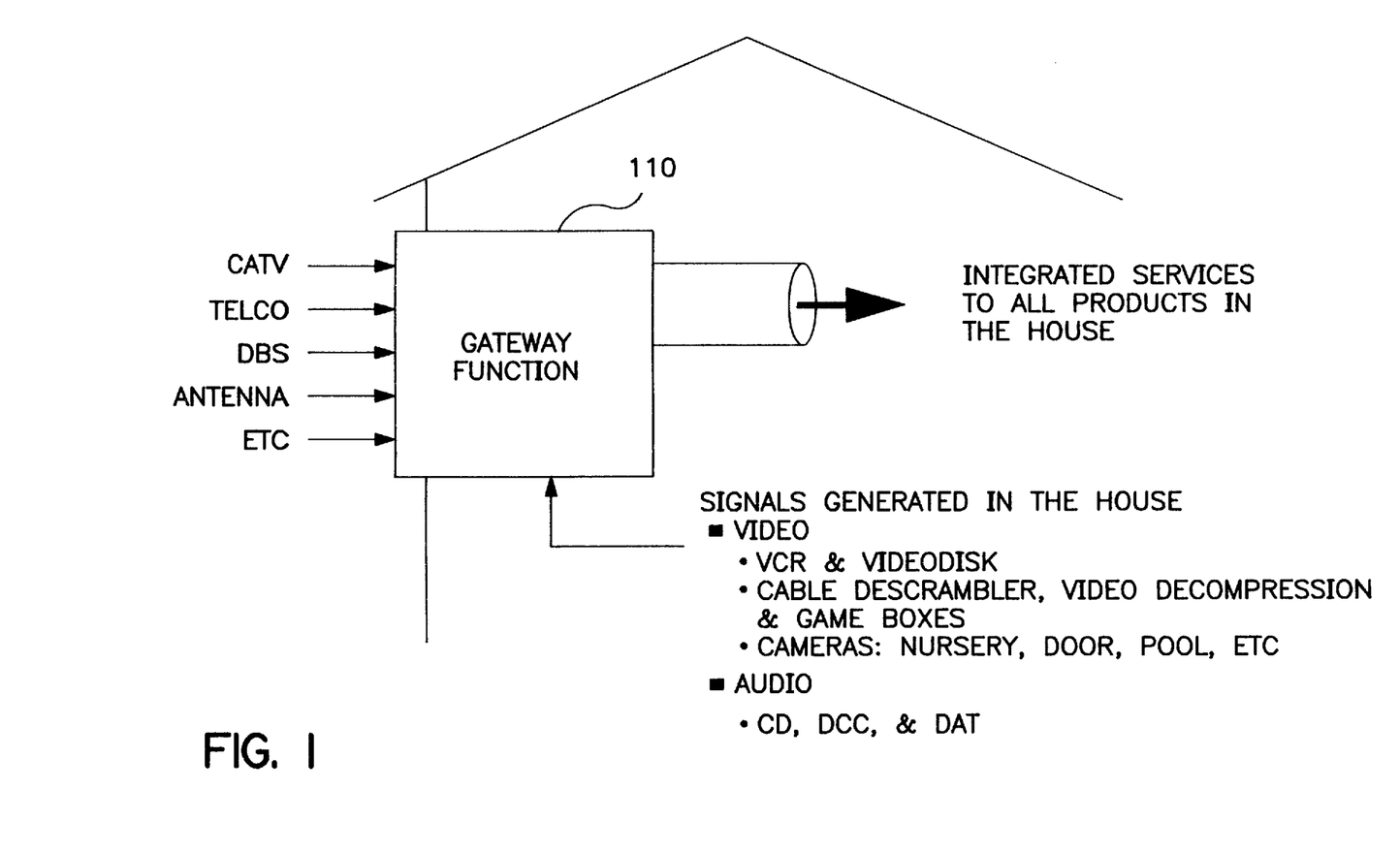
FIG. 1 is a high-level functional block diagram of an exemplary embodiment of the present invention.
Figure 4A:
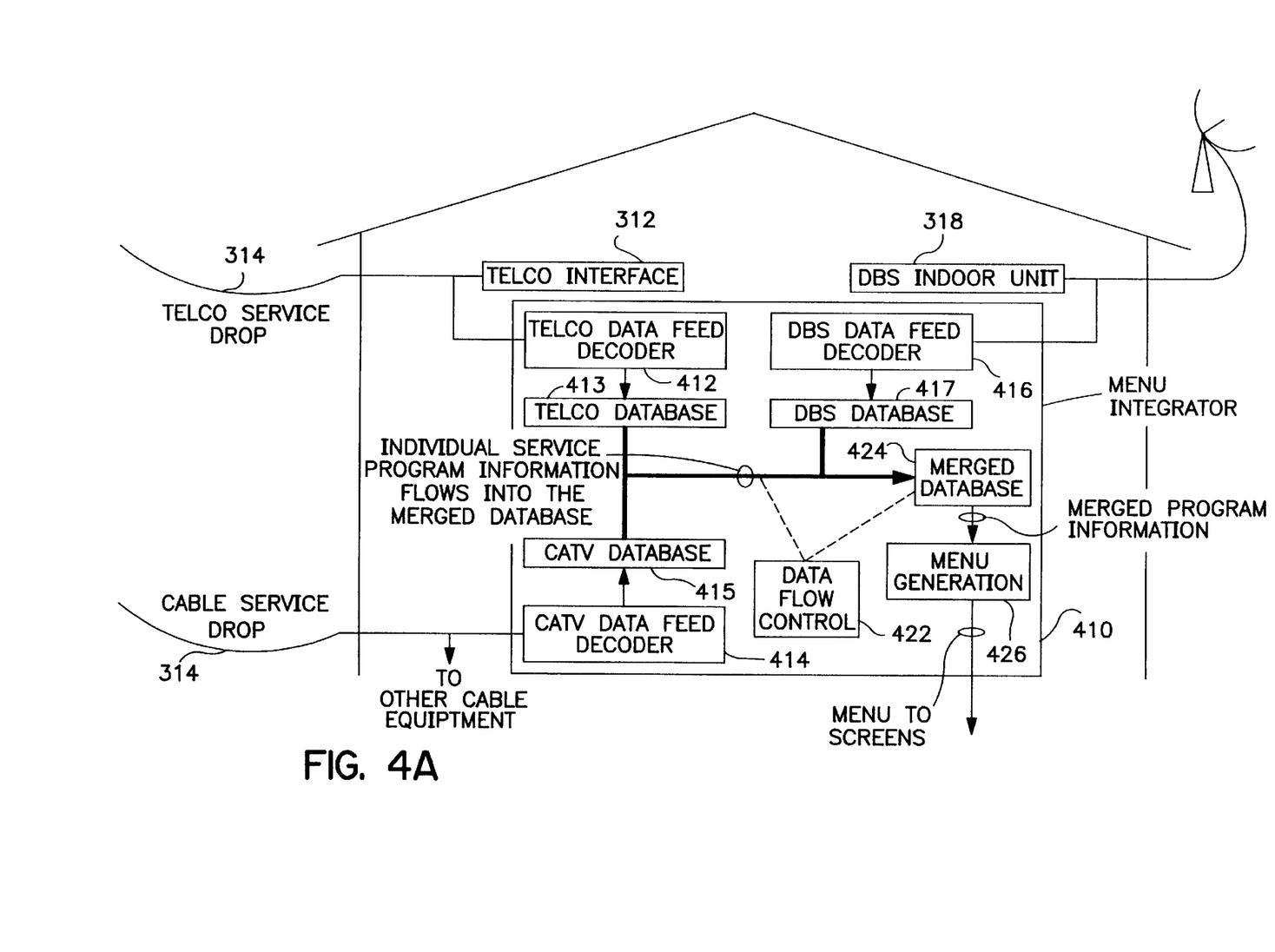
FIG. 4A is the high-level functional block diagram of the gateway shown in FIG. 3 further including exemplary embodiment of an apparatus for providing a single merged database.

FIG. 1 is a high level functional illustration of the present invention. Generally speaking, the gateway 110 is responsible for the physical connection of an interface (illustrated in FIG. 4) for each outside delivery service (e.g. CATV, TELCO, DBS, etc.) to an in-home distribution system. Although in the exemplary embodiment of the present invention, the system is described within a home environment, other environments (e.g., business) are readily recognized by those skilled in the art.

Continuing with FIG. 1, gateway 110 is responsible for 1) properly placing the resulting data signals from the interfaces, which are compatible with consumer equipment, on the distribution network, and 2) arranging for the remote control of the interfaces through connection to a control channel. At the same time, the gateway 110 also manages the placement onto the distribution network of data signals from in-house equipment such as VCRs, CDs, etc.

It should be noted that the function of gateway 110 can also be accomplished by other circuitry or by way of a distributed gateway such as multiple independent tuners in a single television receiver. In this instance, the program information data may be collected and processed using circuits within the television receiver.

In the exemplary embodiment of the present invention, the implementation of the gateway 110 includes a Consumer Electronics Bus (CEBus) or the like.

The CEBus is a standard developed by the Electronic Industries Association. The CEBus standard provides for establishing a Local Area Network, or LAN, over five physical distribution media: the power line (PLBus), twisted pair (TPBus), coaxial cable (CXBus), infrared light (IRBus), and low power radio (RFBus).

The CXBus network provides the information necessary to facilitate the exchange of data and control information over the coax medium within a home. A detailed description of the CXBus network may be found in the "EIA-XXX.03 Physical Layer and Media Specifications". The CXBus is also described in O'Brien Jr., "Physical and media specifications of the CXBus", IEEE Transactions on Consumer Electronics, Vol. 37, Number 3, August, 1991, both of which are hereby incorporated by reference.

Figure 2:
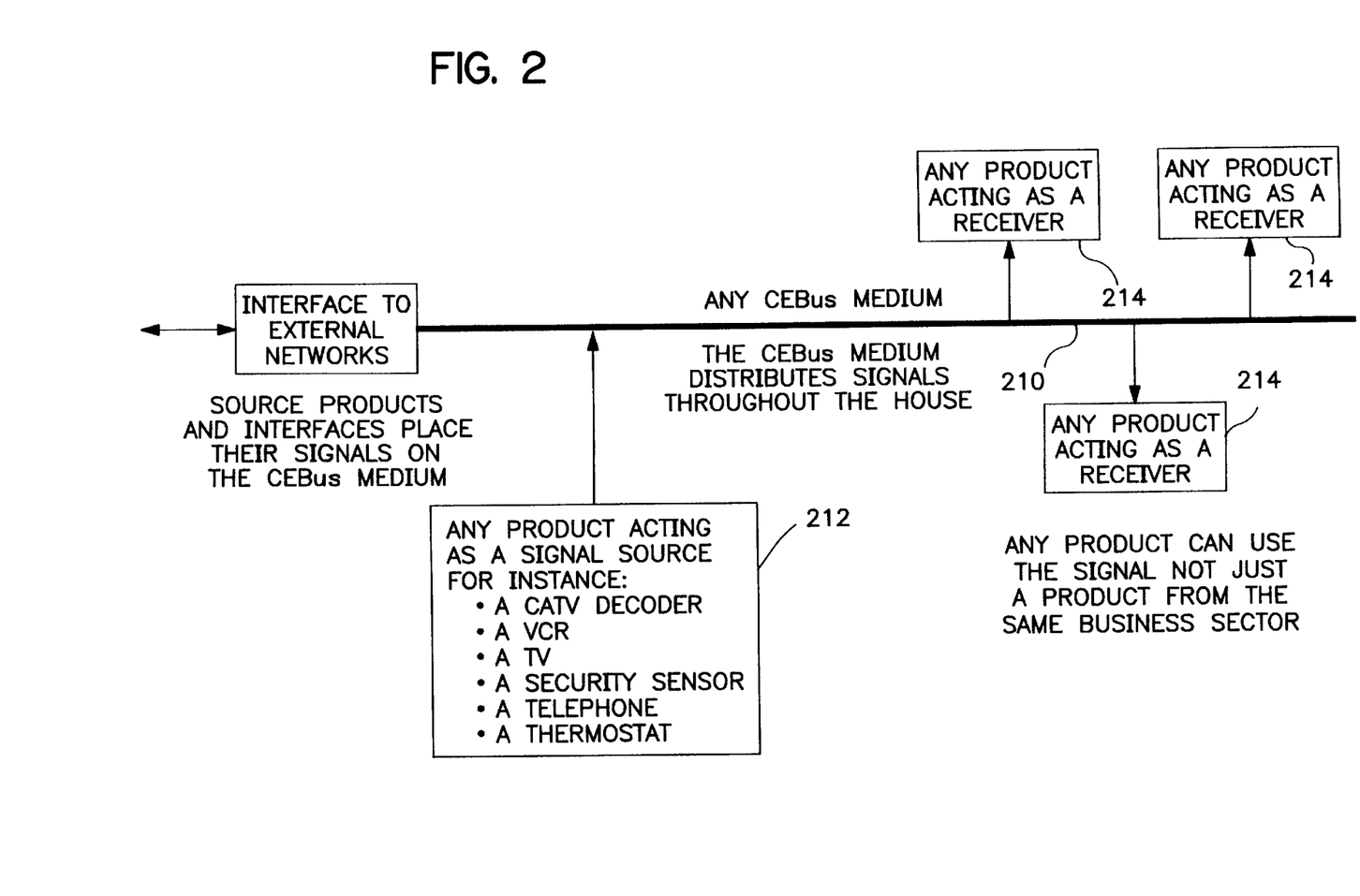
FIG. 2 is a high-level functional block diagram illustrating basic CEBus connection and operation.

FIG. 2 illustrates the basic concept of connection and operation of the CEBus 210. As shown in functional blocks 212, CEBus 210 can support the integration of signals from the outside delivered by, for example, CATV and telephone networks with those generated from products inside the home, such as VCRs. And, these integrated signals can be delivered to any product 214 with receiving capabilities and coupled to the CEBus 210.

The CEBus 210 differs from most LANs in that its architecture provides for a control channel as well as data channels. The CEBus data channels are presently supported on the TPBus and CXBus.

Both the TPBus and CXBus are wideband media, and are able to support a large number of signals that have been spectrally multiplexed onto the medium. As described in the above-referenced articles, the control channel is a narrowband signal used as a "party line" for products connected to the medium. Communication on the party line is by digital packets where a packet is a group of "1s" and "0s" arranged in a set of fields that include at least a destination address field and a message field.

Products use the CEBus control channel to send short commands, small amounts of data, or to negotiate for spectrum space in which to place signals that may be inappropriate for the control channel. Data signals may be inappropriate for the control channel because of modulation type, duration, or the bandwidth needed to accommodate them. Examples of signals requiring data channels are transmit and receive audio for telephone applications, and baseband or radio frequency (RF) video signals.

In the exemplary embodiment of the present invention, the CXBus is used for carrying data signals because of its ability to handle wideband signals such as digitized audio and video at RF.

Figure 3:
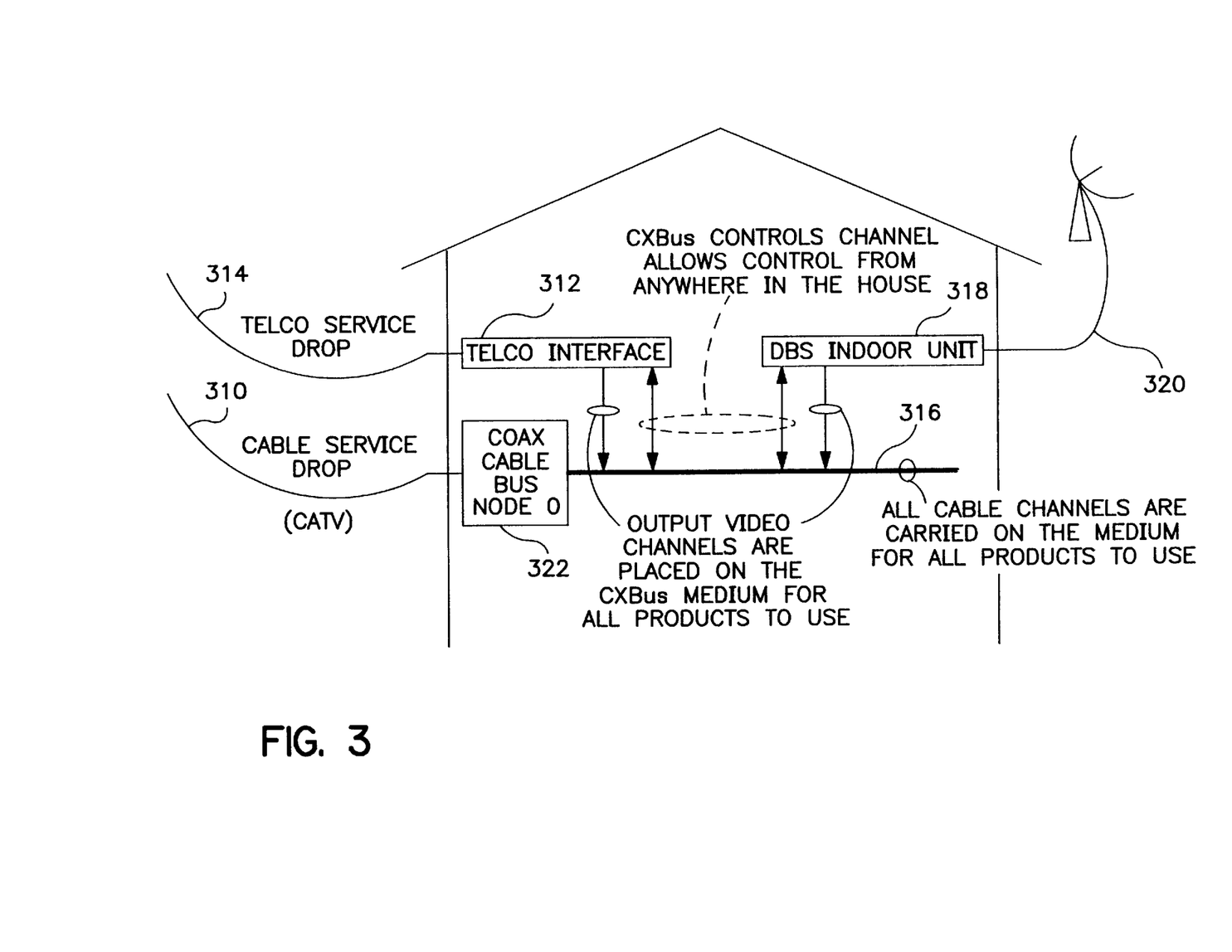
FIG. 3 is a high-level functional block diagram depicting the gateway of FIG. 1 including a CEBus environment.

By way of example, FIG. 3 illustrates an exemplary method for implementing gateway 110 using the CXBus 316. As shown in FIG. 3, the household is using services delivered by CATV 310, TELCO 314, and DBS 320. The CATV signals are typically sent to the home by coaxial cable 310, and range in their bandwidth from about 50 MHz to 1 GHz, depending on the locally operating system. In the exemplary embodiment of the present invention, the entire spectrum of signals received from CATV 310 is placed on the CXBus 316 as it is received from the system operator; therefore, any television receiver, VCR, or cable interface box that is connected to the CXBus 316 anywhere in the home operates as if it were connected directly to each source.

The CXBus standard makes provisions for the spectrum management of wideband In-House Generated Signals (IHGS) for integrating them with the signals coming into the home from the outside.

In order to accommodate the very wide spectrum needs of CATV, the CXBus uses two cables, labeled the external and internal cables (not shown). CATV or TV antenna signals are placed on the external cable, while IHGS are placed on the internal cable. The IHGS signals are then carried by the internal cable to NODE 0 322 which is a "headend".

It should be noted that in general a Node 0 can perform the following functions:

1) combine the signals from the internal cable;
2) block frequency converts IHGS data channel signals for distribution back on the internal or external cables;
3) amplify block converted data channel signals to drive the required number of external or internal cable branches, overcoming the losses of splitters and cables;
4) provide amplification for distributing CATV signals;
5) provide, optionally, a CATV signal return path for two-way cable services; and
6) provide control channel regeneration and distribution on all internal cables.

The need to place other video signals representing the IHGS or menus on higher channels arises from the CATV and off-air connection to the coaxial cable 316. The CATV and off-air connection generally uses the lower channels, therefore, the other video signals are sent over unused or available channels at the higher end of the available spectrum. This is generally accomplished by Node 0 accepting video signals (from the system controller or other internal devices) on the internal cable of the CEBus, where the internal cable has a bandwidth of approximately 96 MHz, and block converting these signals to appropriate channels on the external cable of the CEBus to which the CATV feed is directly connected; thus, the external cable carries the integrated services described with reference to FIG. 1. For example, the signals delivered by TELCO drop 314 may be treated as IHGS, delivered to NODE 0 322 by the internal cable, and placed on the external cable by NODE 0 322.

The services provided by TELCO (e.g., near video-on-demand) may be delivered to the home by the same narrowband copper lines that carry the telephone service, or may use wideband delivery techniques. Such video services over narrowband copper lines can be delivered by a compression and delivery protocol called Asynchronous Digital Subscriber Loop (ADSL).

The signal format of this transport protocol is different than the NTSC video signal format expected by the subscriber's TVs and VCRs. So an interface 312 may be placed between the telephone service drop 314 and the distribution network 316. The interface 312 uses the telephone line to communicate with a central office switch to place a subscriber's order, and then translates the received ADSL encoded video signal to NTSC formatted video. To order, for example, an on-screen menu may be provided. The menu could display various items each having some indication as to the origin of the item (i.e., TELCO, CATV, etc.) and the cost. The indication may be in the form of an additional field maintained in the database and not displayed on the screen. Then, when an item is selected, the user interface system would know, based on the origin indicator, that an order would have to be placed through an ADSL box and execute the necessary instructions to do so.

Continuing with FIG. 3, an output stage of the interface 312 is a modulator which places the NTSC data signal on the internal cable of the CXBus 316 as an IHGS in an unused data channel.

Interface 312 is also connected to the CXBus control channel, which allows remote control units from anywhere in the home to turn on the interface 312 in order to place an order. Thus, the interface between the TELCO system and the user's system is transparent to the user, that is to say, there is no additional effort needed on the user's part.

The DBS interface 318, as well as most other interfaces that one of ordinary skill in the art may contemplate, work in substantially the same way as the above-described TELCO interface 312.

While this aspect of the present invention provides a user with access to each of the service sources over a single distribution network within the home, at this stage, a user still must manually "call up" the program information (typically presented in the form of a menu) for each service and search it. Thus, if a subscriber, as assumed, is receiving video-on-demand or other services from more than one service provider, the program information would have to be searched separately and manually to discover what the various services are offering at any given time.

Accordingly, another aspect of the present invention provides for simplification of this search-by-menus, or any other search algorithm or method, by merging the menus from the different services into a single merged database. In the exemplary embodiment of the present invention, the single merged database includes a single physical database with random entries. In an alternate embodiment, using some pre-processing, the random entries can be either integrated or segregated in some predetermined way prior to being stored in the merged database. It should also be noted that those skilled in the art will also recognize that this database of program information for all service providers may be implemented in other ways such as a plurality of individual databases accessed as a single virtual database. Furthermore, any individual databases used for the virtual database do not have to be in any particular order, rather they can be indexed using conventional indexing techniques such as an index file.

Moreover, it should be noted that "on-line" service providers need not be the only sources providing program information to the merged database. For example, one such outside source which could contribute program information to the database, rather than TELCO, CATV or the like, could be an external input such as a bar code reader (with the proper peripheral links and software) which reads information from paper input program guides published in a daily paper or weekly guide for available programs (e.g., TV Guide). Additionally, it is contemplated that a single source (e.g., TV Guide) may provide program information for more than one service provider (e.g., CATV and TELCO) in the form of individual EPGs or the like.

In the exemplary embodiment, the single merged database is implemented by tapping the electronic data streams (e.g., the data stream for the EPGs) from each of the delivery services, and placing the resulting data into a new database. Given a merged database including the program information for all of the various service providers, individual menus can be generated, with user supplied criteria (e.g., type, subtype, time, keywords in the title, etc), which include entries from all of the service providers. In essence, the user supplied criteria creates a type of filter which can either be used to positively identify a criteria (e.g., list all "comedies") or negatively remove unwanted information (e.g., all movies except those rated R, NC-17, or X). Upon display of the individually tailored menus, a user can instruct the user interface to print out, using an appropriately connected printer (not shown), the custom menu for subsequent selection of programs to be viewed.

This type of merged database results in integrated menus which can significantly reduce the difficulty for a subscriber in searching the options from various service providers at any given time.

It should be noted that prior knowledge of the data structure from each service provider (or information data feed) as well as communication protocol with each interface is assumed. Given this advance knowledge of the data structure and communication protocol for each service, the data feeds for each service are tapped, possibly separately buffered, and merged to provide for a single main database as shown in FIG. 4A.

As seen in FIG. 4A, the TELCO and DBS service drops (e.g., 314) are tapped before their connection to the individual interface boxes. The tapped feed is processed by respective decoders—TELCO decoder 412, DBS decoder 414 and CATV decoder 414—and the resulting baseband data flows are stored in individual databases—TELCO database 413, CATV database 415 and DBS database 417.

Flow control system 422 regulates the flow of data from the individual databases into the merged database 424. It should be noted that, in the exemplary embodiment of the present invention, database software known to those skilled in that art can be used to implement merged database 424 such as DBase or FoxBase.

Continuing, flow control 422, in the exemplary embodiment, includes a processor (not shown) for performing the various searching techniques to be applied to the individual sources of data and/or the combined database. A data flow control system is desirable for many reasons including to perform searches or other user instructions, to make efficient use of existing processors, to perform data updates at regular, predetermined intervals to ensure that stale data is not displayed and to ensure complete records are received (if small data blocks are being transferred) before integrating the data into the combined database.

Figure 4B:
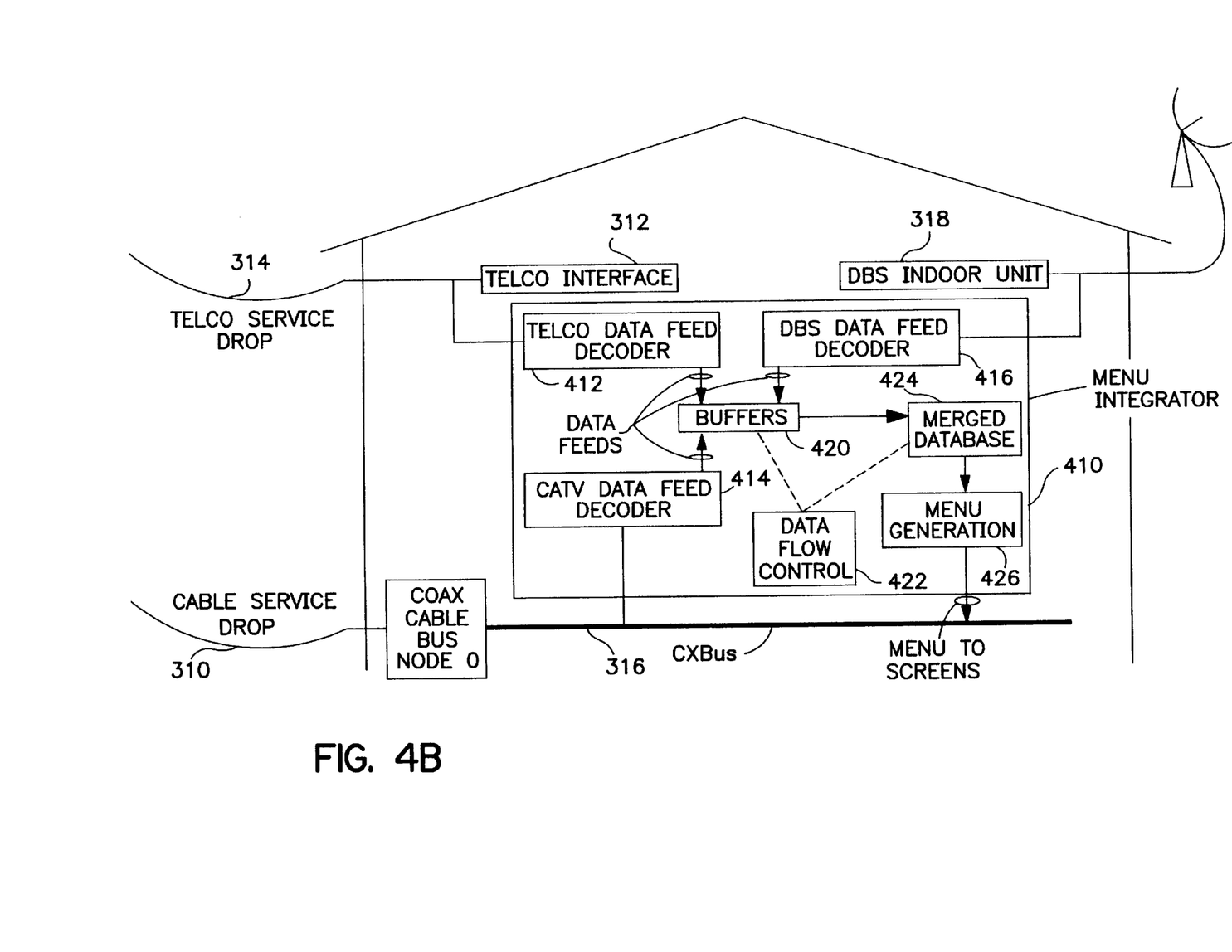
FIG. 4B is the high-level functional block diagram of the gateway shown in FIG. 3 further including another exemplary embodiment of an apparatus for providing a single merged database.

In an alternative implementation, as illustrated in FIG. 4B, a similar configuration is used except no individual databases are provided. Rather, the decoded program information from the various providers is forward to buffers 420 (preferably, at least one buffer is dedicated to each data feed). In this embodiment, buffers 420 provide a flow control system 422 with the ability (i.e., time and bandwidth) to regulate each flow so that the appropriate information is directed to the proper location in the merged database structure 424. For example, buffers 420 would be small in size and essentially used to compensate for timing differences between the program information being received and the ability of the merged database to accept that program information in a timely manner.

It is contemplated that the program information retrieved from the individual databases by flow control system 422 for each service can be stored in the main database 424 using several different formats. A first format stores the data in a modular manner such that each service provider has a completely separate section of the database. For example, CATV has section A of the combined database, TELCO has section B and so on. In this way, continuous data updates could be easily accomplished by locating the database section for that service and doing a bulk overwrite or some variation thereof. However, using this format, each time a new user request is entered (e.g., display all comedies), each section of the database would have to be individually searched for the request and then appropriately combined for display purposes.

For efficient operation, it is desirable that the system which processes the various data streams has advance knowledge of the respective data structure of the program information (i.e., program entries in the data stream, records in an individual database, etc.).

Referring back to FIG. 4A, a menu generation device 426 uses the information in the merged database to create menus in a video signal format which are placed on the internal cable and processed, as described above, by a Node 0.

It should be noted that FIGS. 4A and 4B only show the connections necessary for generating the merged database. The connections shown in FIG. 3 for placing the video signals from the interface boxes onto the CXBus still exist, however, for the sake of clarity, they have been omitted from FIGS. 4A and 4B. Moreover, also included is a remote control interface (not shown) which receives commands (e.g., program and function selection) from the subscriber and executes them. The commands are executed by processing the selection if possible, or by transmitting an appropriate communication to an interface box (e.g., placing an order) via the CXBus control channel for example.

It is contemplated that the actual program information to be stored in the merged database can be delivered from many different sources including:

1) control signals in control information sent by an information delivery company;
2) program information encoded during the vertical blanking interval of every program transmitted by a particular service; and
3) program information available in bar-code form from printed publication distributed by service provider, in this case, bar code reading and interface circuitry (not shown, although well known in the art) is needed to transfer the bar code information to the data flow controller 422 for processing and subsequent storing in the merged database 424.

In the exemplary embodiment of the present invention, to identify the source of a particular entry (e.g., program), each entry in the integrated database 424 has at least one more field than in the original EPG. This additional field holds an indication of the service source providing the program.

Figure 5:
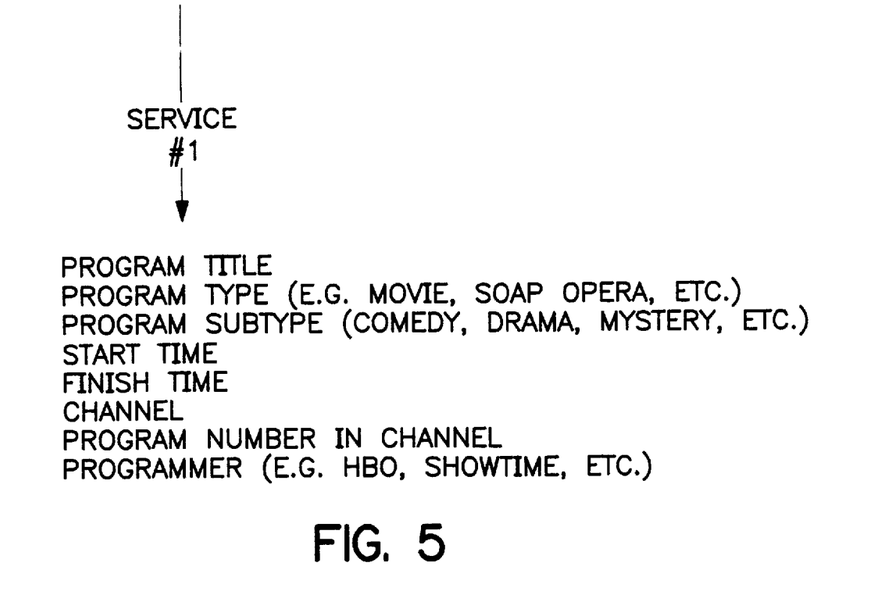
FIG. 5 is a data structure diagram which illustrates how information in a record for program information from an individual service source may appear.

For example, FIG. 5 shows what a typical service may provide for the fields in a record of the database. As seen, a database record may include basic information such as title, type, subtype, etc. In the exemplary embodiment, each of the fields in a record are available for searching and classifying. That is to say, a user desiring to watch or record a comedy would request a listing of all comedies available on a particular night from all of the available sources. Again, this is especially useful when developing and/or employing the integrated database 424.

Figure 6:
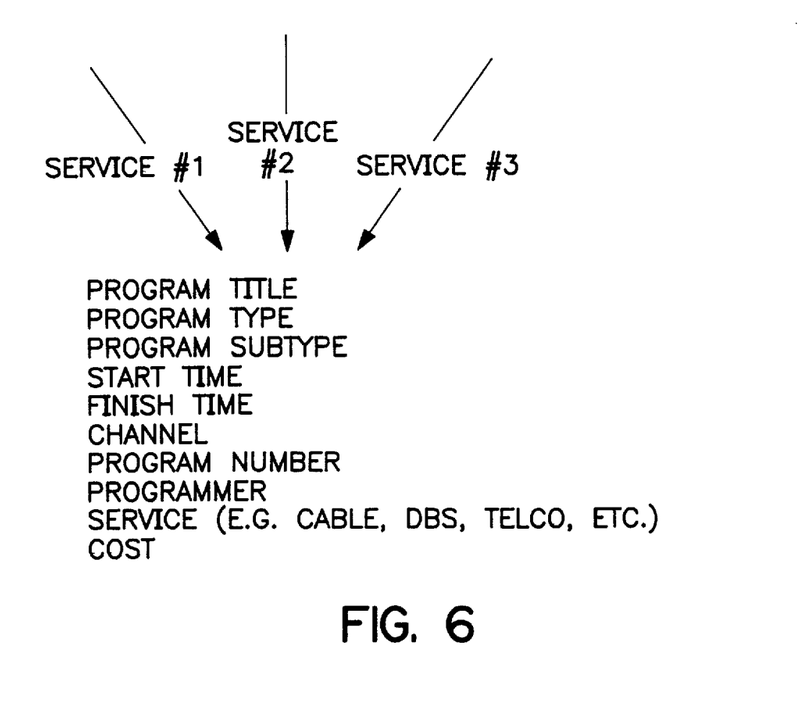
FIG. 6 is a data structure diagram which illustrates field(s) added to the record of FIG. 5 for purposes of integration and searching.

An exemplary data structure in the integrated database is shown in FIG. 6. This structure is essentially the same as the structure shown in FIG. 5 except it includes a field for identifying which service is providing the particular program. Continuing with the above example, if a user requests program information for all available comedies, the present invention searches the merged database, covering all providers, and generates a list of what comedies are available and what service is providing them.

In addition to the service provider field, other fields can be used for indicating such aspects as cost of the program (also shown in FIG. 6). This particular field, for example, would allow the present invention to search for and find the cheapest source of a particular program requested (possibly by title) by the user.

Figure 7:
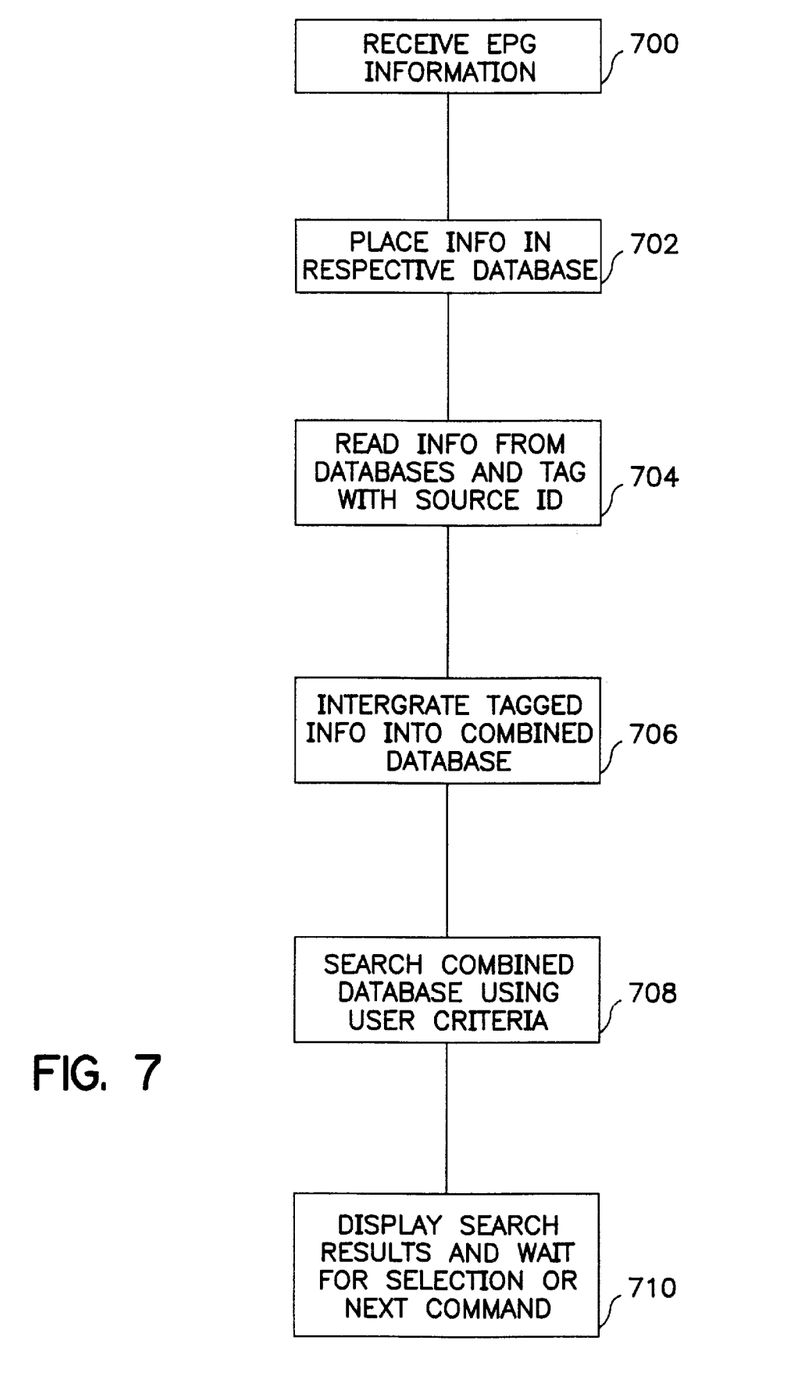
FIG. 7 is a flow chart illustrating an exemplary sequence of steps performed in conjunction with the present invention.

FIG. 7 shows a flowchart of an exemplary sequence of steps employing the present invention. At step 700, program information (or EPG signal) is received from at least two different sources at a home. The received information, at step 702, is decoded and stored in individual databases (as shown in FIG. 4A). At step 704, the flow controller 422 reads and tags the information with a source identifier. Finally, the tagged information is integrated into the single merged database.

Figure 8:
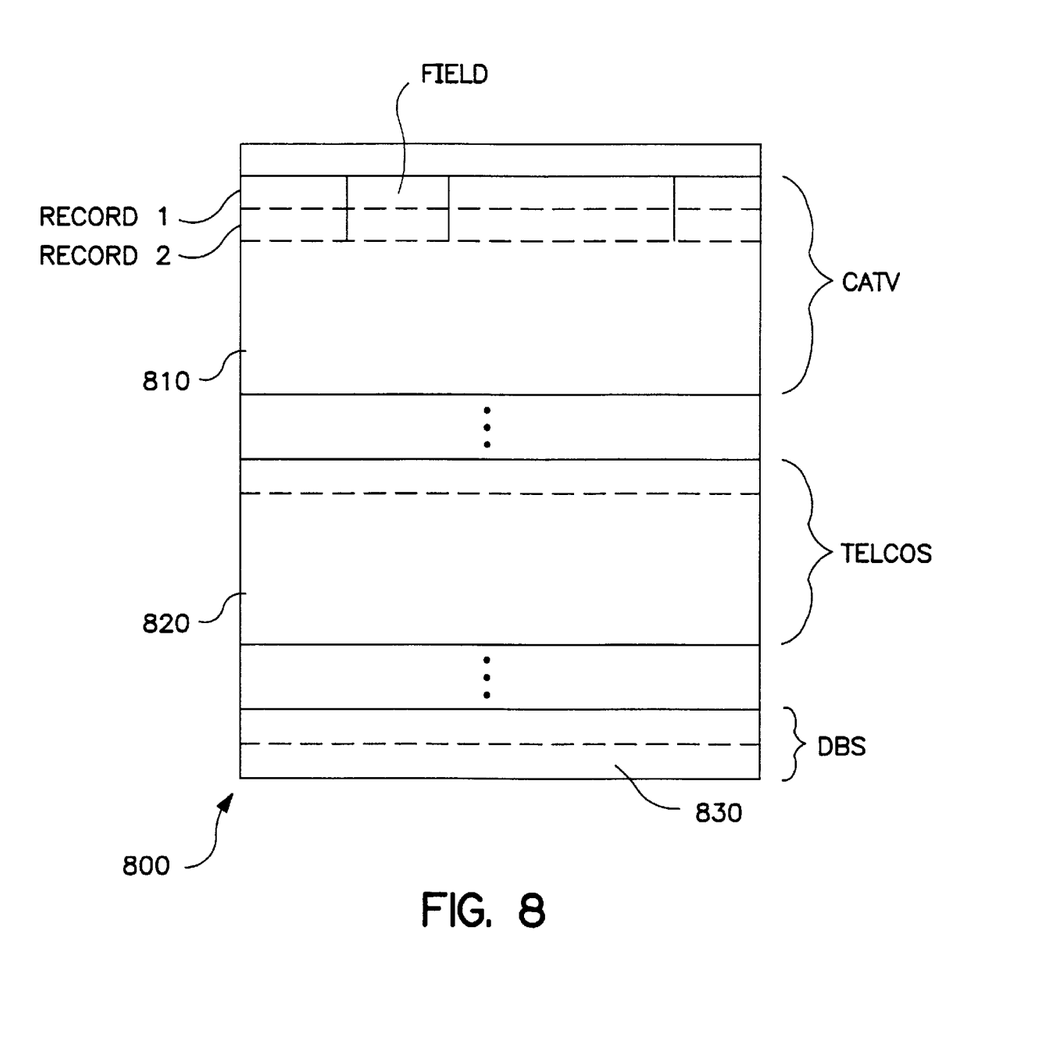
FIG. 8 is a diagram of exemplary individual areas in a single merged database for storing the records of particular service providers as described in FIG. 7.

FIG. 8 shows an exemplary layout of the memory areas in an exemplary form of the merged database 800 indicating particular memory areas for CATV 810, TELCOS 820 and DBS 830. Within each memory area, individual records are stored which include the previously described fields each of which, in the exemplary embodiment, is accessible to user defined searches.

Referring back to FIG. 7, once a combined database is established, a user, at step 708, can instruct the system via a cursor/display interface or keyboard to search the merged database for particular records. For example, a user can ask for all comedies being shown on a particular evening. And, at 710, the results of the user defined search are displayed.

Figure 9A:
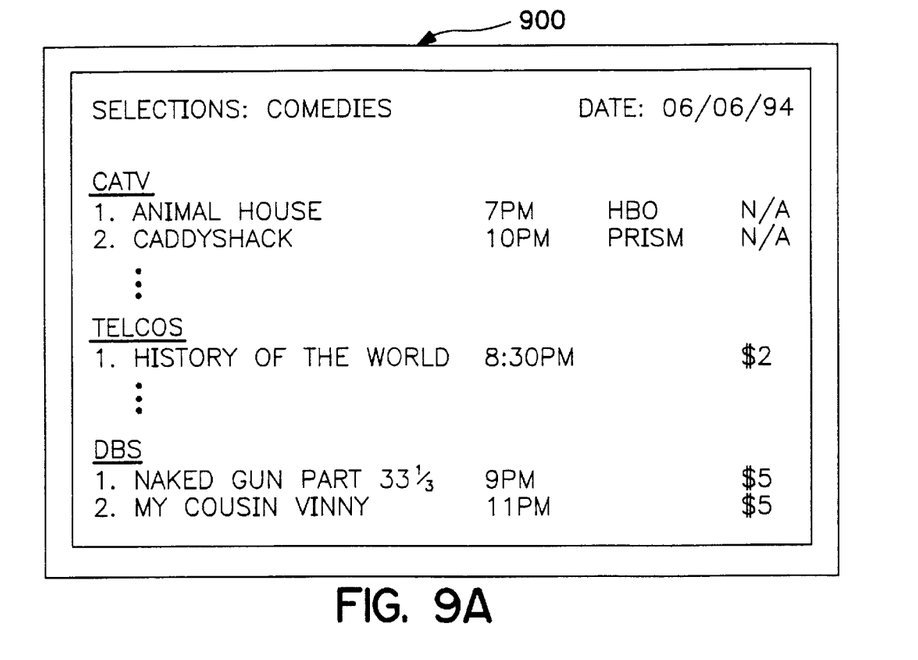
FIG. 9A is a diagram of an exemplary display of available items in the merged database of FIG. 8.

FIG. 9A shows an exemplary display for the results of a search for all comedies showing on Jun. 6, 1994. As shown, each service provider (e.g., CATV, TELCOS, DBS) is listed along with the titles, start time, programmer if applicable (e.g., HBO) and cost if applicable for each comedy airing on Jun. 6, 1994.

Figure 9B:
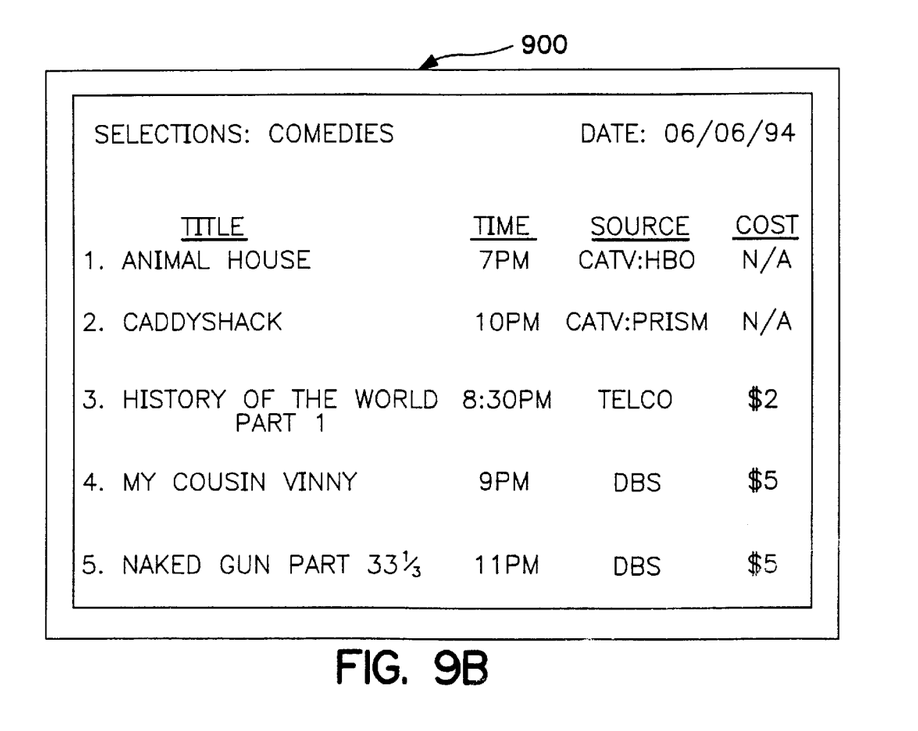
FIG. 9B is a diagram of an exemplary display of available items in the merged database of FIG. 8.

FIG. 9B shows an alternative display to that shown in FIG. 9A. In FIG. 9B, the programs are listed alphabetically with a field in the displayed menu indicating which service provider is offerring the program.

Although the invention is illustrated and described herein as embodied in a method and apparatus for handling outside services menus in home systems, the invention is not intended to be limited to the details shown. Rather, various modifications may be made in the details within the scope and range of equivalents of the claims and without departing from the spirit of the invention.

What is claimed:

1. A method for presenting program information to a display device from a plurality of different outside delivery services, each of the delivery services providing a respective plurality of channels, comprising the steps of:

receiving a signal from each of the plurality of different outside delivery services, each of the signals providing respectively different program information relating to the respective plurality of channels of the delivery service;

storing the received program information signals;

integrating, according to a predetermined classification, the respective program information signals relating to each respective plurality of channels into a merged database;

generating a display with the program information presented in the predetermined classification; and displaying the display with the program information on a television.

2. The method of claim 1, wherein the program information received from each outside delivery service includes individual program entries, wherein the step of integrating comprises the steps of decoding the received signals to extract the respective program information;

adding to the respective program information an indication of its respective outside delivery service; and storing the respective program information including entries with the indication of respective outside delivery service in respective sections of the merged database.

3. The method of claim 2, further comprising the step of storing the decoded signals in respective individual databases prior to storing them in the single merged database.

4. The method of claim 2, wherein each program entry includes fields indicating a title and a topic.

5. The method of claim 2, wherein the sections in which the program information, with entries having the indication of respective outside delivery service, is stored are partitioned according to respective outside delivery service.

6. The method of claim 2, further comprising the step of adding, prior to storing the program information in respective sections of the merged database, at least one additional field to each entry.

7. The method of claim 6, wherein the additional field includes an indication of a cost for ordering the program.

8. The method of claim 1, further comprising the step of receiving and executing program and function selections from the user in response to the displayed program entries.

9. An apparatus for presenting program information to a display device from a plurality of different outside delivery services, each of the outside delivery services providing a plurality of channels, comprising:

means for receiving a signal from each of the plurality of different outside delivery services, each of the signals providing respectively different program information relating to the respective plurality of channels of the delivery service;

merged database means for storing information;

means for storing the respective program information relating to the respective pluralities of channels in the merged database means;

means for arranging the stored program information in a predetermined order;

means for generating a display with the program information presented in the predetermined order; and means for displaying the display with the program information on a television.

10. The apparatus of claim 9, wherein the program information received from each outside source includes individual program entries, wherein the means for integrating includes means for decoding the received signals to extract the respective program information;

means for adding to the respective program information an indication of its respective outside delivery service; and means for storing the respective program information, including entries with the indication of its respective outside delivery service, in respective sections of the merged database means.

11. The apparatus of claim 10, further comprising a plurality of individual database means for storing information; and means for storing the decoded signals in respective individual databases prior to storing them in the merged database means.

12. The apparatus of claim 10, wherein each program entry includes fields indicating a title and a topic.

13. The apparatus of claim 10, wherein the sections in which the program information, with the entries having the indication of respective outside delivery service, is stored are partitioned according to respective outside delivery service.

14. The apparatus of claim 10, further comprising the means for adding, prior to storing the program information in respective sections of the merged database means, at least one additional field to each entry.

15. The apparatus of claim 14, wherein the additional field includes an indication of a cost for ordering the program.

16. The apparatus of claim 9, further comprising means for receiving and executing program and function selections from the user in response to the displayed program entries.

17. The apparatus of claim 9, wherein the merged database means is a random entry database.

18. The method of claim 2, wherein the step of storing includes randomly storing the program entries in the merged database.

19. A method for presenting program information to a display device from at least two different outside delivery services, each of the different outside delivery services having a plurality of channels, said method comprising the steps of:

receiving respectively different program information for the at least two outside delivery services relating to the respective pluralities of channels carried by the outside delivery services;

storing the received program information in a merged database;

indexing, in a predetermined order, the respective program information relating to the respective pluralities of channels in the merged database; and generating a display with the program information presented in the predetermined order; and displaying the display with the program information on a television.

20. The method of claim 1, wherein the plurality of different outside delivery services include at least two services from a group consisting of cable television (CATV), telephone company (TELCO), direct broadcast satellite (DBS), and antenna.

21. The apparatus of claim 9, wherein the plurality of different outside delivery services include at least two services from a group consisting of cable television (CATV), telephone company (TELCO), direct broadcast satellite (DBS), and antenna.

22. A method for presenting program information to a display device from a plurality of different outside delivery services, said method comprising the steps of:

receiving signals from each of the plurality of different outside delivery services, each of the signals providing respectively different program information;

decoding the received signals to extract the respective program information, wherein the signals for the respective outside delivery services have respectively different formatting;

storing the respective decoded program information;

adding, to the respective program information, an indication of the respective outside delivery service;

sorting, in a predetermined order, the respective program information in a merged database; and displaying, program entries contained in the merged database to a user for viewing.

* * * * *